United States Patent
Morita

(10) Patent No.: US 10,645,276 B2
(45) Date of Patent: May 5, 2020

(54) IMAGE PICKUP APPARATUS THAT PERFORMS BOUNCE FLASH PHOTOGRAPHY, CONTROL METHOD THEREFOR, AND STORAGE MEDIUM

(71) Applicant: CANON KABUSHIKI KAISHA, Tokyo (JP)

(72) Inventor: Takuro Morita, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/909,072

(22) Filed: Mar. 1, 2018

(65) Prior Publication Data

US 2018/0262680 A1    Sep. 13, 2018

(30) Foreign Application Priority Data

Mar. 9, 2017   (JP) .................. 2017-044938

(51) Int. Cl.
| | |
|---|---|
| H04N 5/225 | (2006.01) |
| H04N 5/232 | (2006.01) |
| H04N 5/235 | (2006.01) |
| H04N 5/238 | (2006.01) |
| G03B 7/17 | (2014.01) |
| G03B 15/05 | (2006.01) |

(52) U.S. Cl.
CPC .......... H04N 5/23225 (2013.01); G03B 7/17 (2015.01); G03B 15/05 (2013.01); H04N 5/2256 (2013.01); H04N 5/238 (2013.01); H04N 5/2354 (2013.01); H04N 5/23245 (2013.01)

(58) Field of Classification Search
CPC ....................................... H04N 5/2256
USPC .................................... 348/370, 371
See application file for complete search history.

(56) References Cited

U.S. PATENT DOCUMENTS

| | | | | |
|---|---|---|---|---|
| 5,276,473 A | * | 1/1994 | Stephenson, III | G02B 7/10 396/174 |
| 2014/0368729 A1 | * | 12/2014 | Takai | H04N 5/2354 348/371 |
| 2014/0375837 A1 | * | 12/2014 | Ichihara | H04N 5/2354 348/222.1 |
| 2015/0156389 A1 | * | 6/2015 | Umehara | G03B 15/05 348/242 |
| 2015/0309390 A1 | * | 10/2015 | Yamamoto | G03B 15/05 348/370 |

FOREIGN PATENT DOCUMENTS

JP        H04-340527 A        11/1992

* cited by examiner

*Primary Examiner* — Anthony J Daniels
(74) *Attorney, Agent, or Firm* — Carter, DeLuca & Farrell LLP

(57) ABSTRACT

An image pickup apparatus which is capable of improving ease of operation for a photographer in bounce flash photography. The image pickup apparatus is able to be equipped with an illumination apparatus having a light emitter and has an operating portion for causing light from the light emitter to be reflected by a reflector to illuminate a subject. It is judged whether or not a first mode in which in response to operation on the operating portion, light from the light emitter to be reflected by the reflector to illuminate the subject is set as an operating mode of the illumination apparatus. According to whether or not the illumination apparatus is placed in the first mode, different types of control are provided when the operating portion is operated.

7 Claims, 5 Drawing Sheets

FIG. 4

| COMMAND | NUMBER OF BYTES | DESCRIPTION |
|---|---|---|
| 10H | 3 | LIGHT EMISSION MODE INFORMATION REQUEST |
| 12H | 2 | LIGHT EMISSION MODE SETTING |
| 14H | 2 | WIRELESS MODE INFORMATION REQUEST |
| 16H | 2 | WIRELESS MODE SETTING |
| 18H | 2 | CHARGING COMPLETION CONFIRMATION |
| 20H | 2 | LIGHT EMISSION ENABLE NOTIFICATION |
| 22H | 2 | FRONT DRIVING COMMAND |
| 24H | 2 | CEILING DRIVING COMMAND |
| 26H | 2 | COLLECTIVE DRIVING COMMAND |
| 28H | 2 | BOUNCE ANGLE DRIVING COMMAND |
| 30H | 2 | DRIVING STATE OBTAINING REQUEST |
| 32H | 2 | FLASH AMOUNT SETTING |
| 34H | 1 | MODELING FLASH COMMAND |
| 36H | 2 | AUTO BOUNCE FUNCTION STATUS REQUEST |

IMAGE PICKUP APPARATUS THAT PERFORMS BOUNCE FLASH PHOTOGRAPHY, CONTROL METHOD THEREFOR, AND STORAGE MEDIUM

BACKGROUND OF THE INVENTION

Field of the Invention

The present invention relates to an image pickup apparatus, a control method therefor, and a storage medium, and in particular to how a radiating direction of light is controlled when an image is picked up by irradiating a subject with the light.

Description of the Related Art

In general, what is called bounce flash photography is known in which light is emitted from an illumination apparatus toward a reflector such as a ceiling, and a subject is irradiated with diffused light reflected by the reflector. In the bounce flash photography, a subject is indirectly irradiated with light from the illumination apparatus, and hence the subject is rendered with soft light.

For the bounce flash photography, there is a function of determining a radiation angle (hereafter referred to as the bounce angle) of the illumination apparatus based on a distance from an image pickup apparatus to a subject and a distance from the image pickup apparatus to the reflector (see Japanese Laid-Open Patent Publication (Kokai) No. H04-340527). The function of determining the bounce angle in this manner is called an auto-bounce function.

The auto-bounce function is a function of finding a radiation angle of the illumination apparatus, and for this purpose, the illumination apparatus is usually provided with a special button. For this reason, a photographer needs to press the special button provided in the illumination apparatus while holding the image pickup apparatus, and sometimes, operation is extremely difficult for the photographer.

On the other hand, even if the image pickup apparatus is provided with a special button for using the auto-bounce function, this special button would be enabled only in a case where a special illumination apparatus supporting the auto-bounce function is installed in the image pickup apparatus. Therefore, the ease of use for the photographer is extremely bad.

SUMMARY OF THE INVENTION

The present invention provides an image pickup apparatus and a control method therefor, which are capable of improving ease of operation for a photographer in bounce flash photography, and a storage medium.

Accordingly, the present invention provides an image pickup apparatus which is able to be equipped with an illumination apparatus having a light emitter, comprising an operating portion, at least one processor, according to programs stored in a memory, the processor functions as a judgment unit configured to judge whether or not a first mode in which in response to an operation on the operating portion, light from the light-emitter is reflected by a reflector to illuminate a subject is set as an operating mode of the illumination apparatus; and a control unit configured to, according to whether or not the judgment unit judges that the illumination apparatus is placed in the first mode, provide different types of control when the operating portion is operated.

According to the present invention, ease of operation for a photographer is improved.

Further features of the present invention will become apparent from the following description of exemplary embodiments (with reference to the attached drawings).

BRIEF DESCRIPTION OF THE DRAWINGS

FIG. 4 is a diagram showing examples of communication commands sent from the camera main body in FIG. 1 to the flash in FIG. 1.

DESCRIPTION OF THE EMBODIMENTS

An example of an image pickup apparatus according to an embodiment of the present invention will now be described with reference to the accompanying drawings.

Figure 1:
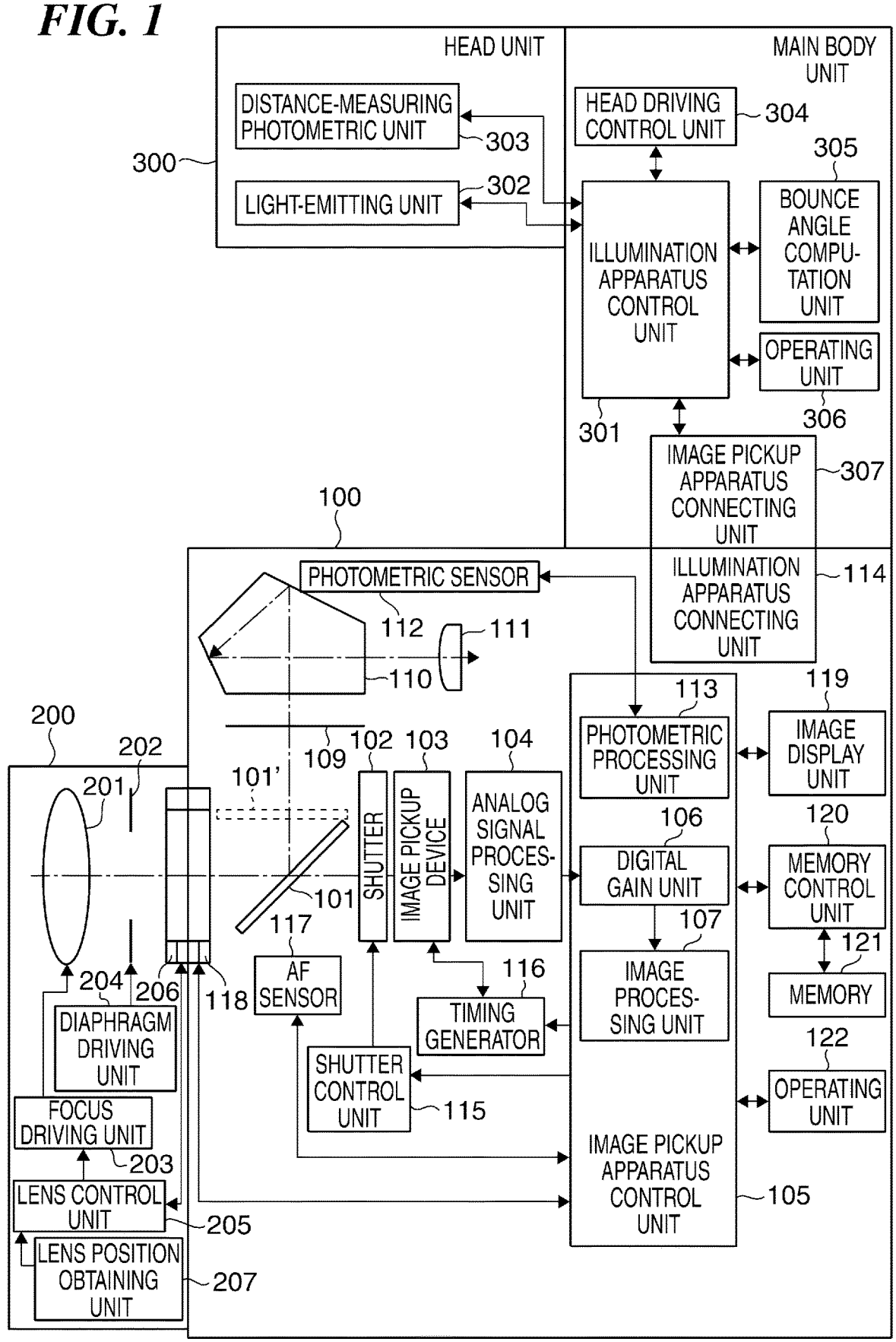
FIG. 1 is a block diagram showing an example of an image pickup apparatus according to an embodiment of the present invention as well as an illumination apparatus.

FIG. 1 is a block diagram showing an example of the image pickup apparatus according to the embodiment of the present invention as well as an illumination apparatus.

The image pickup apparatus shown in the figure is what is called a single-lens reflex camera (hereafter referred to merely as the camera), and a lens unit 200 is removably mounted on a camera main body 100. An illumination apparatus (hereafter referred to as the flash) 300 as well is removably mounted on the camera main body 100. Namely, the flash 300 is able to be mounted on the camera main body 100.

The camera main body 100 is provided with a main mirror 101, rotation of which is controlled according to an operating state of the camera. For example, when a subject is observed through a finder, the main mirror 101 is obliquely inserted into a shooting optical path (indicated by alternate long and short dashed lines) to guide an optical image, which has passed through the lens unit 200, to a viewfinder optical system. On the other hand, at the time of shooting, the main mirror 101 retracts from the shooting optical path, and this causes an optical image, which has passed through the lens unit 200, to be formed on an image pickup device 103. In the example shown in the figure, a position 101 of the main mirror 101 when it is placed on the shooting optical path is indicated by a solid line, and a position 101' of the main mirror 101 when it is retracted from the shooting optical path is indicated by a dotted line.

A shutter 102 is located in a stage subsequent to the main mirror 101 and used in control for causing an optical image, which has passed through the lens unit 200, to fall upon the image pickup device 103. The shutter 102 is normally closed, and at the time of shooting, controlled to be opened. It should be noted that the shutter 102 is controlled by an image pickup apparatus control unit 105 through a shutter control unit 115.

The image pickup device 103 outputs an image signal corresponding to an optical image. For example, a CMOS sensor or a CCD sensor is used as the image pickup device 103. The image pickup apparatus control unit 105 drivingly controls a timing generator (TG) 116 and drives the image pickup device 103 based on a timing signal, which is output from the TG 116, to convert the optical image into an analog signal (image signal) through photoelectric conversion.

An analog signal processing unit 104 samples and holds the analog signal, which is output from the image pickup device 103, and then converts the analog signal into a digital signal through A/D conversion by adding an analog gain to the analog signal. The image pickup apparatus control unit 105 performs predetermined digital signal processing on the digital signal, which is output from the analog signal processing unit 104, and stores the digital signal as image data in a memory 121 by means of a memory control unit 120.

Specifically, the image pickup apparatus control unit 105 causes a digital gain unit 106 to add a digital gain to the digital signal. An image processing unit 107 performs predetermined digital signal processing, for example, a pixel interpolation process and a color conversion process on an output from the digital gain unit 106 to generate image data.

An image display unit 119 is a monitor such as an LCD, which is placed on a back of the camera main body 101, and an image and shooting information are displayed on the image display unit 119. An operating unit 122 is an input unit for receiving instructions from a photographer. The operating unit 122 is provided with a variety of operating buttons, for example, an AF instruction button, a shooting instruction button, an auto bounce instruction button, and an AE instruction button. The operating unit 122 sends input operations performed by the photographer to the image pickup apparatus control unit 105.

A focusing screen 109 is placed on a primary image forming surface of the lens unit 200, and an incident plane of the focusing screen 109 is provided with a Fresnel lens (light-gathering lens). The focusing screen 109 forms an optical image (viewfinder image) on an exit plane thereof. A pentaprism 110 changes the path of a beam and corrects an optical image, which is formed on the exit plane of the focusing screen 109, to an erect image.

When looking through the viewfinder, the photographer is able to adjust visibility according to his or her eyes by means of an eyepiece 111. A photometric sensor 112 has photodiodes (PD) for respective areas obtained by dividing an image pickup area and outputs luminance values of the respective areas in an optical image, which is formed on the exit plane of the focusing screen 109, to a photometric processing unit 113.

An AF sensor 117 outputs an amount of defocus obtained by, for example, an image plane phase difference method to a focus detecting process unit, not shown. Based on the amount of defocus, the image pickup apparatus control unit 105 determines a lens driving amount. Based on the lens driving amount, the image pickup apparatus control unit 105 then drivingly controls the lens unit 200 through a communication terminal 118.

It should be noted that the image pickup apparatus control unit 105 is a microcomputer which has a CPU, a ROM, a RAM, and so forth. The CPU controls the entire camera by executing programs stored in the ROM.

The lens unit 200 has a taking lens 201. The taking lens 201 is a lens group comprised of, for example, a focusing lens and a zoom lens. The taking lens 201 causes an optical image (subject image) to fall on the camera main body 100.

The lens unit 200 has a diaphragm 202 and adjusts an aperture of the diaphragm 202 to adjust an amount of light at the time of shooting.

A lens control unit 205 controls a diaphragm driving unit 204 to control the aperture of the diaphragm 202. A focus driving unit 203 attains focus by displacing a position of the taking lens 201 along an optical axis under the control of the lens control unit 205.

The lens control unit 205 is responsible for controlling the entire lens unit 200. The lens control unit 205 also obtains information on a distance from a zoom position (focal length information) and an in-focus position of the taking lens 201 based on a position of the taking lens 201 obtained by a lens position obtaining unit 207.

A communication terminal 206 is for the lens unit 200 to carry out communications with the camera main body 100. The communication terminal 118 is for the camera main body 100 to carry out communications with the lens unit 200. When the lens unit 200 is mounted on the camera main body 100, the communication terminal 118 and the communication terminal 206 are connected together. Namely, the lens unit 200 carries out communications with the image pickup apparatus control unit 105 through the communication terminals 206 and 118.

The flash 300 is removable from the camera main body 100 as described earlier and has a main body unit and a head unit. The main body unit has an illumination apparatus control unit 301 which, for example, controls light emission and controls an angle of the head unit.

The head unit has a light-emitting unit 302, which emits light according to a light-emitting instruction from the illumination apparatus control unit 301. A distance-measuring photometric unit 303 receives light, which is reflected by an object targeted for distance measurement (subject) as a result of light emission by the light-emitting unit 302, and measures an amount of received light. The distance-measuring photometric unit 303 outputs the amount of received light to the illumination apparatus control unit 301. Further, based on the amount of received light, the distance-measuring photometric unit 303 obtains a distance from the camera to the object targeted for distance measurement as a measured distance.

A head driving control unit 304 drives the head unit horizontally and vertically with respect to the main body unit under the control of the illumination apparatus control unit 301. Further, the head driving control unit 304 finds a driving amount by which the head unit is driven, and based on the driving amount, outputs a position of the head unit relative to the main body unit to the illumination apparatus control unit 301. It should be noted that driving the head unit causes the light-emitting unit 302 and the distance-measuring photometric unit 303 to face directly toward the object targeted for distance measurement.

A bounce angle computation unit 305 obtains an optimum bounce angle based on the amount of received light and the measured distance, which were obtained by the distance-measuring photometric unit 303, under the control of the illumination apparatus control unit 301. An operating unit 306 is an input unit that receives operations performed by the photographer. The operating unit 306 is provided with, for example, a light emission mode setting button, an auto bounce instruction button, an auto bounce function on/off selector switch, and a variety of operating buttons. The operating unit 306 outputs input operations performed by the photographer to the illumination apparatus control unit 301.

It should be noted that the auto bounce instruction button functions when the auto bounce function on/off selector switch is on.

An image pickup apparatus connecting unit 307 connects the flash 300 and the camera main body 100 together. The illumination apparatus control unit 301 communicates with the image pickup apparatus control unit 105 via the image pickup apparatus connecting unit 307 and an illumination apparatus connecting unit 114.

Figure 2:
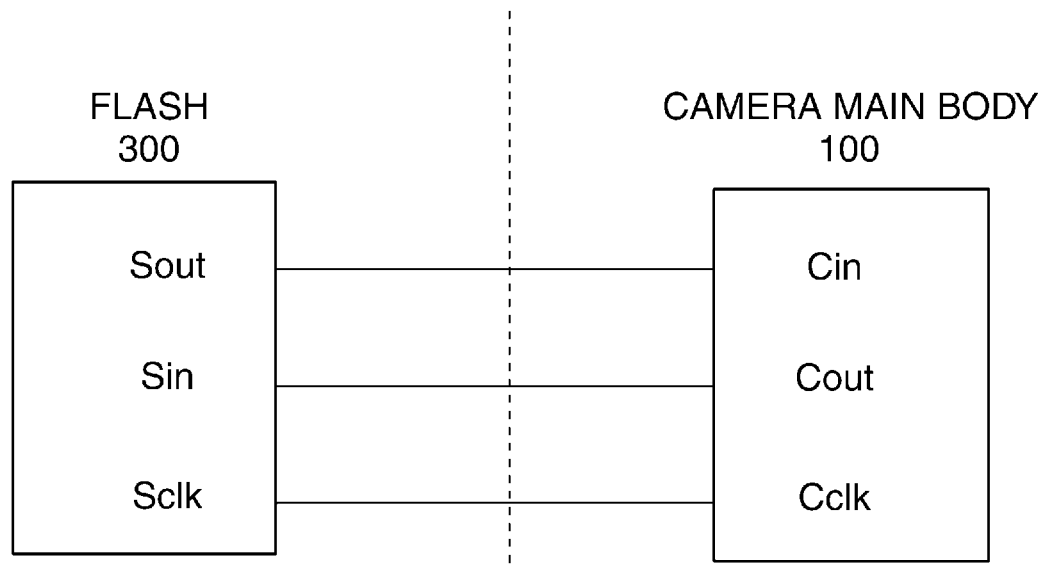
FIG. 2 is a diagram showing examples of contacts when a camera main body and a flash in FIG. 1 are connected together.

FIG. 2 is a diagram showing examples of contacts when the camera main body 100 and the flash 300 are connected together. Namely, FIG. 2 shows contacts when the image pickup apparatus connecting unit 307 and the illumination apparatus connecting unit 114 are connected together.

The image pickup apparatus connecting unit 307 has contacts Sout, Sin, and Sclk. The contact Sout is a data output terminal of the flash 300 using clock synchronization communication. The contact Sin is a data input terminal using clock synchronization communication. The contact Sclk is an output terminal for clock synchronization signals.

The illumination apparatus connecting unit 114 has contacts Cout, Cin, and Cclk. The contact Cout is a data output terminal of the camera main body 100 using clock synchronization communication. The contact Cin is a data input terminal using clock synchronization communication. The contact Cclk is an output terminal for clock synchronization signals.

Figure 3:
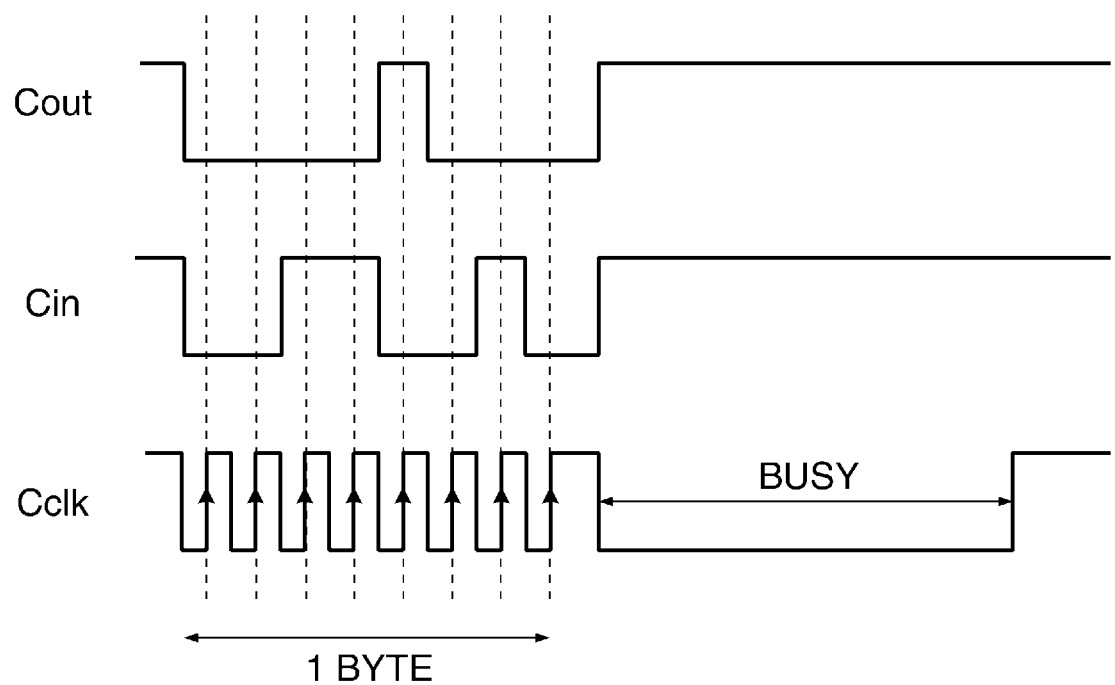
FIG. 3 is a diagram showing examples of signal waveforms at the contacts of an illumination apparatus connecting unit appearing in FIG. 2.

FIG. 3 is a diagram showing examples of signal waveforms at the contacts of the illumination apparatus connecting unit 114 appearing in FIG. 2.

In synchronization with a rising edge of a clock synchronization signal output from the contact Cclk, the camera main body 100 receives data input from the contact Cin of the camera main body 100. In synchronization with the rising edge of the clock synchronization signal output from the contact Cclk, the camera main body 100 also sends data from the contact Cout to the flash 300.

In a section where the level of the clock synchronization signal output from the Cclk terminal is LOW for a predetermined time period, the camera main body 100 is waiting for completion of processing (busy) with the level of the contact Cclk being LOW. When a communication process is completed, the camera main body 100 raises the level of the Cclk terminal to HIGH.

It should be noted that FIG. 3 shows a state in which the camera main body 100 receives data represented by 32HEX from the flash 300.

FIG. 4 is a diagram showing examples of communication commands sent from the camera main body 100 to the flash 300 in FIG. 1.

In the examples shown in the figure, the amounts of data output from the camera main body 100 are set in advance for the respective commands. Here, when the camera main body 100 sends a command 10H to the flash 300, the flash 300 recognizes this command as a "light emission mode information request". The flash 300 then sends information, which indicates modes in which the flash 300 is able to emit light, in data of the second byte which is sent to the camera main body 100.

It should be noted that the modes in which the flash 300 is able to emit light include light emission modes for shooting such as an automatic adjustment mode, a manual light emission mode, and a multi light emission mode. The information indicating the modes in which the flash 300 is able to emit light includes judgment information for use in judging functions which the flash 300 has, such as auto bounce function supporting information and modeling flash function supporting information. The flash 300 also sends information, which indicates modes set in the flash 300, in data of the third byte which is sent to the camera main body 100.

When the camera main body 100 sends a command 12H to the flash 300, the flash 300 recognizes this command as a "light emission mode setting" and sets light emission mode information based on the data of the second byte sent from the camera main body 100.

When the camera main body 100 sends a command 26H to the flash 300, the flash 300 recognizes this command as a "collective driving command". Upon receiving this command, the flash 300 drives the head unit toward a subject, emits light for measuring a distance to the subject, drives the head unit toward a ceiling and sequentially emits light for measuring a distance to the ceiling. The flash 300 then obtains an optimum bounce angle based on the measurement results, and according to this bounce angle, drives the head unit.

When the camera main body 100 sends a command 30H to the flash 300, the flash 300 recognizes this command as a "driving state obtaining request". The flash 300 then sets an operating state of the flash 300 in the second byte of this command and notifies the camera main body 100 of the operating state. The operating state which the camera main body 100 is notified of is one of "the head running" and "the head not running". When the head is running, the camera main body 100 is notified of "the head running" as the operating state.

When the camera main body 100 sends a command 34H to the flash 300, the flash 300 recognizes this command as a "modeling flash command" and sequentially emits a predetermined amount of light at predetermined intervals.

When the camera main body 100 sends a command 36H to the flash 300, the flash 300 recognizes this command as an "auto bounce working state request" and sends judgment information, which indicates whether or not the auto bounce function is enabled in the flash 300, in the second byte of the command to the camera main body 100. The judgment information, which indicates whether or not the auto bounce function is enabled, is information corresponding to a state of the auto bounce function on/off selector switch.

It should be noted that there are commands other than the communication commands shown in FIG. 4, but description thereof is omitted here.

Figure 5:
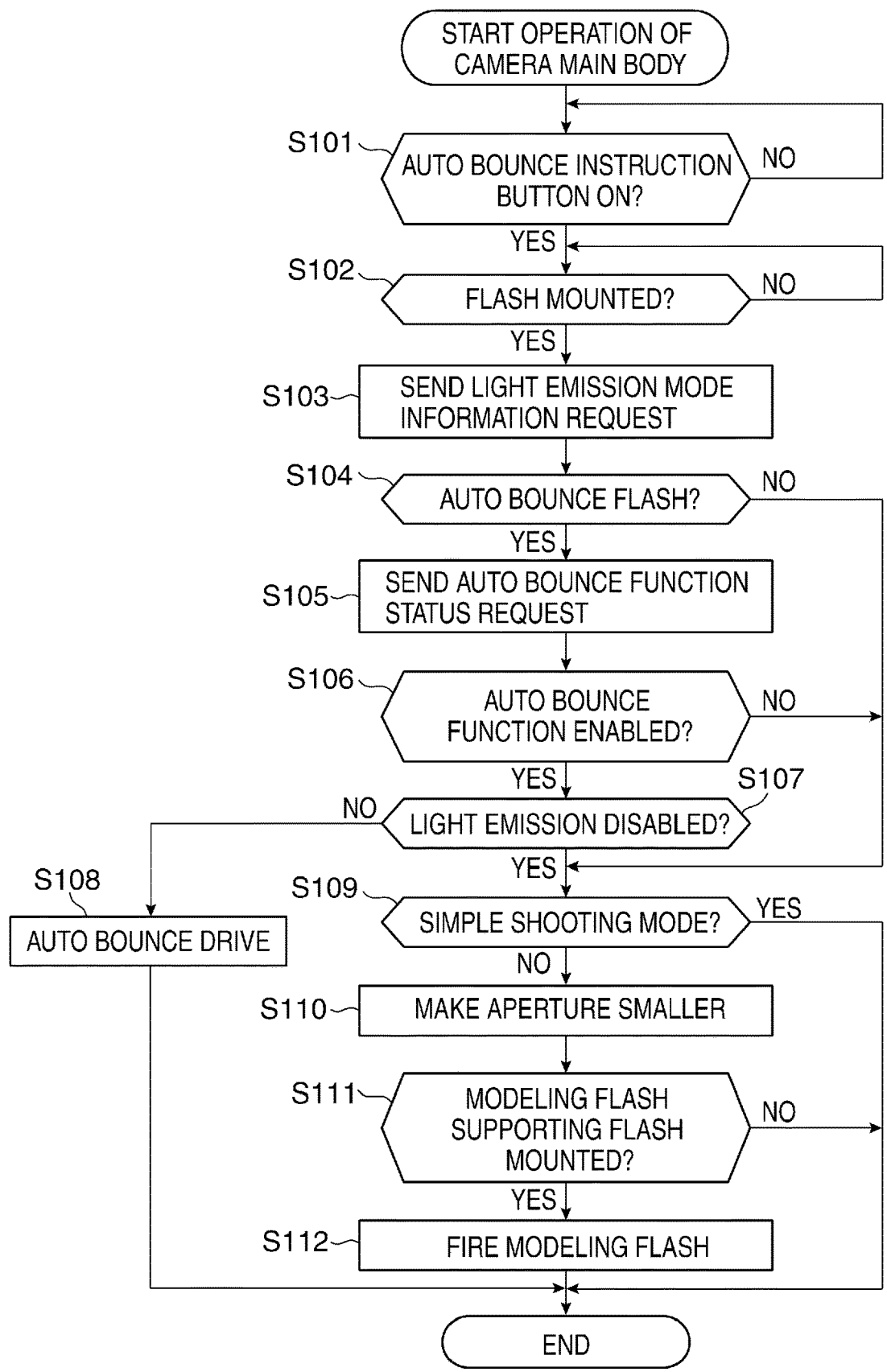
FIG. 5 is a flowchart describing how the camera main body in FIG. 1 works.

FIG. 5 is a flowchart useful in explaining how the camera main body 100 appearing in FIG. 1 works. It should be noted that processes in the flowchart of FIG. 5 are carried out under the control of the image pickup apparatus control unit 105.

When the camera main body 100 starts operating, the image pickup apparatus control unit 105 judges whether or not the auto bounce instruction button provided in the operating unit 122 has been turned on (step S101). Upon judging that the auto bounce instruction button provided in the operating unit 122 is off (NO in the step S101), the image pickup apparatus control unit 105 stands by.

Upon judging that the auto bounce instruction button provided in the operating unit 122 has been turned on (YES in the step S101), the image pickup apparatus control unit 105 judges whether or not the flash 300 is mounted on the camera main body 100 (step S102). Namely, when the auto bounce mode is selected as the operating mode, the image pickup apparatus control unit 105 judges whether or not the flash 300 is mounted on the camera main body 100. Here, the image pickup apparatus control unit 105 detects mounting of the flash 300 on the camera main body 100 by means of a mechanical switch (not shown) provided in the illumination apparatus connecting unit 114 or detects mounting of the flash 300 on the camera main body 100 based on whether or not a communication command has been successfully sent to the flash 300.

Upon judging that the flash 300 is not mounted on the camera main body 100 (NO in the step S102), the image pickup apparatus control unit 105 stands by until the flash 300 is mounted on the camera main body 100. Upon judging that the flash 300 is mounted on the camera main body 100 (YES in the step S102), the image pickup apparatus control unit 105 sends the light emission mode information request (the command 10H) to the flash 300 (step S103). It should be noted that with the light emission mode information request, the image pickup apparatus control unit 105 is able to obtain the auto bounce function supporting information and the modeling flash function supporting information.

Then, by referring to the auto bounce function supporting information, the image pickup apparatus control unit 105 judges whether or not the flash 300 is a flash that supports auto bounce (step S104). Upon judging that the flash 300 is a flash that supports auto bounce (YES in the step S104), the image pickup apparatus control unit 105 sends the auto bounce functioning state request (the command 36H) to the flash 300 (step S105). It should be noted that with the auto bounce functioning state request, the image pickup apparatus control unit 105 is able to obtain information indicating whether or not the auto bounce function of the flash 300 is enabled (auto bounce information).

After that, by referring to the auto bounce information, the image pickup apparatus control unit 105 judges whether or not the auto bounce function is enabled (step S106). Upon judging that the auto bounce function of the flash 300 is enabled (YES in the step S106), the image pickup apparatus control unit 105 judges whether or not light emission is disabled (step S107).

Upon judging that light emission is not disabled (NO in the step S107), the image pickup apparatus control unit 105 drives the flash 300 for auto bounce (step S108). For example, the image pickup apparatus control unit 105 sends the collective driving command (the command 26H) to the flash 300. This causes the flash 300 to drive the head unit toward the subject, emits light for measuring a distance to the subject, drive the head unit toward the ceiling, and emit light for measuring a distance to the ceiling. The flash 300 then obtains an optimum bounce angle based on the measurement results and drives the head unit to this bounce angle. The image pickup apparatus control unit 105 then ends the operation of the camera main body 100.

On the other hand, upon judging that the flash 300 is not a flash that supports auto bounce (NO in the step S104), the image pickup apparatus control unit 105 judges whether or not shooting is possible in a simple shooting mode (step S109).

It should be noted that the simple shooting mode means an automatic shooting mode in which a photographer can properly perform shooting without making complicated settings. Examples of the simple shooting mode include a scene mode in which a shutter speed, an f number, a flash firing state, a sensitivity setting, and so forth are combined together according to a set scene. Examples of the simple shooting mode also include an auto mode in which scene judgment is performed based on measured luminance value and so on and a shutter speed, an f number, a flash firing state, a sensitivity setting, and so forth are combined together according a result of the judgment.

Upon judging that the shooting mode is the simple shooting mode (YES in the step S109), the image pickup apparatus control unit 105 ends the operation of the camera main body 100. On the other hand, upon judging that the shooting mode is not the simple shooting mode (NO in the step S109), the image pickup apparatus control unit 105 controls the lens unit 200 to perform a predetermined operation which is an aperture reducing operation (step S110). When the aperture reducing operation is performed, the size of the aperture is immediately made smaller to a maximum f number or a large f number irrespective of the f number set for the camera.

Then, by referring to the modeling flash function supporting information obtained by the process in the step S103, the image pickup apparatus control unit 105 judges whether or not the flash 300 supports the modeling flash function (step S111). Upon judging that the flash 300 supports the modeling flash function (YES in the step S111), the image pickup apparatus control unit 105 instructs the flash 300 to fire a modeling flash as a predetermined operation (step S112). The image pickup apparatus control unit 105 then ends the operation of the camera main body 100.

On the other hand, upon judging that the flash 300 does not support the modeling flash function (NO in the step S111), the image pickup apparatus control unit 105 then ends the operation of the camera main body 100. It should be noted that upon judging that the auto bounce function is disabled (NO in the step S106), the image pickup apparatus control unit 105 then causes the process to proceed to the step S109. Moreover, when light emission is disabled (YES in the step S107), the image pickup apparatus control unit 105 causes the process to proceed to the step S109. The firing of a modeling flash aims at checking the balance of lighting, whether or not there is a shadow of a subject, and so forth before taking a flash photograph.

Figure 6:
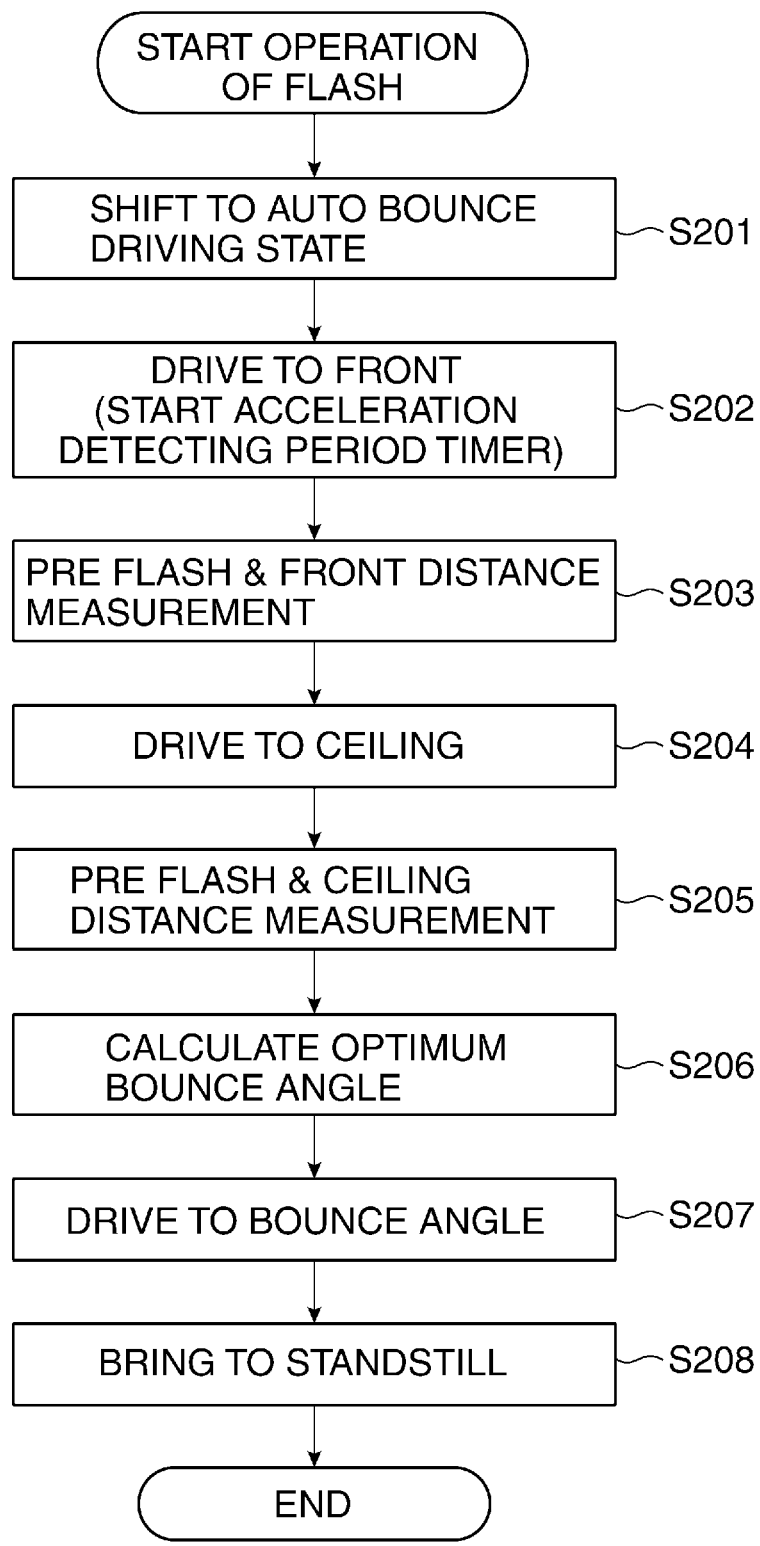
FIG. 6 is a flowchart describing how the flash works when it has received a collective driving command for auto bounce in FIG. 5.

FIG. 6 is a flowchart useful in explaining how the flash 300 works in response to the collective driving command for auto bounce in FIG. 5. It should be noted that processes in the flowchart of FIG. 6 are carried out under the control of the illumination apparatus control unit 301.

Upon receiving the collective driving command (the command 26H), the illumination apparatus control unit 301 brings the flash 300 to an "auto bounce driving state" (step S201). In the "auto bounce driving state", the illumination apparatus control unit 301 provides notification of "auto bounce driving under way" in response to the state obtaining request (the command 30H) sent from the camera main body 100.

Then, the illumination apparatus control unit 301 controls the head driving unit 304 to drive the head unit toward the front (subject) (step S202). When the driving to the front is completed, the illumination apparatus control unit 301 fire a pre flash to find a distance to the subject (front distance) (step S203). Here, the illumination apparatus control unit 301 preliminarily emits a predetermined amount of light, and finds the front distance based on a luminance value (pre-flash luminance value) obtained as a result of photometry by the distance-measuring photometric unit 303 and a value of luminance from natural light, which is obtained in advance.

The illumination apparatus control unit 301 then controls the head driving unit 304 to drive the head unit toward the ceiling (step S204). When the driving to the ceiling is completed, the illumination apparatus control unit 301 fires a pre flash to find a distance to the ceiling (ceiling distance) (step S205). Here, the illumination apparatus control unit 301 fires a pre flash of a predetermined amount of light, and finds the ceiling distance based on a luminance value (pre-flash luminance value) obtained as a result of photometry by the distance-measuring photometric unit 303 and a value of luminance from natural light, which is obtained in advance.

The illumination apparatus control unit 301 then uses the bounce angle computation unit 305 to obtain an optimum bounce angle based on the front distance and the ceiling distance (step S206). Based on the optimum bounce angle, the illumination apparatus control unit 301 controls the head driving unit 304 to drive the head unit to the optimum bounce angle (step S207). After that, the illumination apparatus control unit 301 brings the flash 300 to a state of "being at a standstill" (step S208). In the state of "being at a standstill", the illumination apparatus control unit 301 provides notification of "being at a standstill" in response to the state obtaining request (the command 30H) sent from the camera main body 100. The illumination apparatus control unit 301 then brings the operation of the flash 300 to an end.

As described above, in the present embodiment, when the auto bounce instruction button provided in the operating unit 122 of the camera main body 100 is turned on, different types of control are provided according to a setting on the camera main body 100 and a setting on the flash 300 to enhance ease of operation for the photographer.

It should be noted that in the present embodiment, all the steps in the flowchart of FIG. 5 should not always be performed. The flowchart has only to provide different types of control for the camera main body 100 according to whether or not the flash 300 is placed in a mode in which in response to an operation on the auto bounce instruction button, light from the light-emitting unit 302 is reflected by a reflector to illuminate a subject.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-044938, filed Mar. 9, 2017 which is hereby incorporated by reference herein in its entirety.

What is claimed is:

1. An image pickup apparatus which is able to be equipped with an illumination apparatus having a light emitter, comprising:
    an operating portion;
    at least one processor which executes programs stored in a memory to function as:
        a judgment unit configured to judge whether or not a first mode, in which in response to a first operation on the operating portion, light from the light-emitter is reflected by a reflector to illuminate a subject, is set as an operating mode of the illumination apparatus, wherein the first mode is set among a plurality of modes in response to a second operation different from the first operation; and
        a control unit configured to, according to whether or not the judgment unit judges, when the first operation of the operating portion is operated, that the illumination apparatus is placed in the first mode, provide different types of control.

2. The image pickup apparatus according to claim 1, wherein when the judgment unit does not judge that the illumination apparatus is placed in the first mode, the control unit causes a predetermined operation to be performed according to an operation on the operating portion.

3. The image pickup apparatus according to claim 1, wherein when the judgment unit does not judge that the illumination apparatus is placed in the first mode, the control unit sends a light-emitting instruction, which is different from an instruction for causing light from the light-emitter to be reflected by the reflector to illuminate the subject, to the illumination apparatus according to an operation on the operating portion.

4. The image pickup apparatus according to claim 1, wherein when the judgment unit does not judge that the illumination apparatus is placed in the first mode, the control unit performs an aperture reducing operation to make an aperture smaller according to an operation on the operating portion.

5. The image pickup apparatus according to claim 4, wherein when the judgment unit judges that the illumination apparatus is placed in the first mode, the control unit does not perform the aperture reducing operation even when the operating portion is operated.

6. A control method for an image pickup apparatus which is able to be equipped with an illumination apparatus having a light-emitter and has an operating portion for causing light from the light-emitter to be reflected by a reflector to illuminate a subject, comprising:
    judging whether or not a first mode, in which in response to a first operation on the operating portion, light from the light-emitter to be reflected by the reflector to illuminate the subject, is set as an operating mode of the illumination apparatus, wherein the first mode is set among a plurality of modes in response to a second operation different fromt the first operation; and
    according to whether or not it is judged in the judging, when the first operation of the operation portion is operated, that the illumination apparatus is placed in the first mode, providing different types of control.

7. A non-transitory computer-readable storage medium storing a program for causing a computer to execute a control method for an image pickup apparatus which is able to be equipped with an illumination apparatus having a light-emitter and has an operating portion for causing light from the light-emitter to be reflected by a reflector to illuminate a subject, the control method comprising:

judging whether or not a first mode, in which in response to a first operation on the operating portion, light from the light-emitter to be reflected by the reflector to illuminate the subject, is set as an operating mode of the illumination apparatus, wherein the first mode is set among a plurality of modes in response to a second operation different from the first operation; and according to whether or not it is judged in the judging, when the first operation of the operation portion is operated, that the illumination apparatus is placed in the first mode, providing different types of control.

* * * * *